US012781056B2

(12) United States Patent
Knoote et al.

(10) Patent No.: US 12,781,056 B2
(45) Date of Patent: Nov. 3, 2026

(54) METHOD FOR PROVIDING AN ORGANIC SOLVENT-BASED COMPOSITION WITH RETROREFLECTIVE PROPERTIES

(71) Applicant: Ink Invent IP B.V., Nieuwegein (NL)

(72) Inventors: Jacques Arthur Knoote, Zoetermeer (NL); Paul Willem Mijnen, Utrecht (NL); Harald Paul Kerres, Zoetermeer (NL); Philippus Jacob Muis, Andel (NL); Menno Arthur Knoote, The Hague (NL); Ramon Maria Henricus Schlijper, Delft (NL)

(73) Assignee: Ink Invent IP B.V., Nieuwegein (NL)

( * ) Notice: Subject to any disclaimer, the term of this patent is extended or adjusted under 35 U.S.C. 154(b) by 542 days.

(21) Appl. No.: 18/561,908

(22) PCT Filed: May 16, 2022

(86) PCT No.: PCT/EP2022/063148
§ 371 (c)(1),
(2) Date: Nov. 17, 2023

(87) PCT Pub. No.: WO2022/243227
PCT Pub. Date: Nov. 24, 2022

(65) Prior Publication Data

US 2024/0247149 A1 Jul. 25, 2024

(30) Foreign Application Priority Data

May 18, 2021 (EP) .................................... 21174397

(51) Int. Cl.

| | |
|---|---|
| ***C09D 5/00*** | (2006.01) |
| ***C08K 7/20*** | (2006.01) |
| ***C09D 5/33*** | (2006.01) |
| ***C09D 7/20*** | (2018.01) |
| ***C09D 7/43*** | (2018.01) |
| ***C09D 7/80*** | (2018.01) |

(52) U.S. Cl.
CPC ................ *C09D 5/004* (2013.01); *C08K 7/20* (2013.01); *C09D 7/20* (2018.01); *C09D 7/43* (2018.01); *C09D 7/80* (2018.01); *C08K 2201/003* (2013.01)

(58) Field of Classification Search
CPC ........... C09D 5/004; C09D 7/20; C09D 7/43; C09D 7/80; C08K 7/20; C08K 2201/003
USPC ...................................................... 106/31.04
See application file for complete search history.

(56) References Cited

U.S. PATENT DOCUMENTS

| | | | | |
|---|---|---|---|---|
| 3,228,897 A * | 1/1966 | Nellessen | ............ | C09D 167/00 106/170.57 |
| 4,082,427 A | 4/1978 | Nakashima | | |
| 2004/0157960 A1 | 8/2004 | Rowe | | |
| 2008/0044627 A1 | 2/2008 | Groseclose et al. | | |
| 2014/0322534 A1 | 10/2014 | Suzuki et al. | | |
| 2019/0055412 A1 | 2/2019 | Monickam et al. | | |

FOREIGN PATENT DOCUMENTS

| | | | | |
|---|---|---|---|---|
| CN | 105504912 A | 4/2016 | | |
| CN | 108299979 A | 7/2018 | | |
| CN | 110396316 A | 11/2019 | | |
| CN | 111057435 A * | 4/2020 | ............... | C09D 5/29 |
| CN | 111218190 A | 6/2020 | | |
| EP | 2543700 A1 | 1/2013 | | |
| EP | 2620986 A1 | 7/2013 | | |
| JP | 2001302464 A | 10/2001 | | |
| JP | 2011206655 A | 10/2011 | | |
| JP | 2016089036 A | 5/2016 | | |
| JP | 2017101194 A | 6/2017 | | |
| WO | 2004017104 A2 | 2/2004 | | |
| WO | 2014109564 A1 | 7/2014 | | |
| WO | 2019060492 A1 | 3/2019 | | |
| WO | 0042113 A1 | 7/2020 | | |

OTHER PUBLICATIONS

International Search Report and Written Opinion pertaining to Application No. PCT/EP2022/063148 dated Sep. 14, 2023, 10 pages.

* cited by examiner

*Primary Examiner* — James E Mcdonough
(74) *Attorney, Agent, or Firm* — DINSMORE & SHOHL LLP

(57) ABSTRACT

The invention relates to a method for providing a composition selected from the group consisting of organic solvent-based pastes, inks, paints and coating formulations with retroreflective properties, said method comprising the steps of: a) providing an organic solvent-based paste, ink, paint or coating formulation without retroreflective properties; b) providing a retroreflective organic solvent-based composition consisting of, based on the total weight of the retroreflective organic solvent-based composition: 10-49.85 wt. % of organic solvent; 50-85 wt. % of spherical glass beads having a median particle diameter D50, as measured with laser diffraction, between 1 and 1500 μm, and a refractive index, measured at a wavelength λ of 589 nm, between 1.5 and 2.8:0.15-3.5 wt. % of thickener; and 0-10 wt. % of one or more further ingredients; c) mixing the organic solvent-based ink, paint or coating formulation without retroreflective properties provided in step (a) with the retroreflective organic solvent-based composition provided in step (b) in a weight ratio of between 30:70 to 70:30, to provide an organic solvent-based paste, ink, paint or coating formulation with retroreflective properties.

17 Claims, No Drawings

METHOD FOR PROVIDING AN ORGANIC SOLVENT-BASED COMPOSITION WITH RETROREFLECTIVE PROPERTIES

CROSS REFERENCES TO RELATED APPLICATIONS

This application is a national-stage application under 35 U.S.C. § 371 of International Application No. PCT/EP2022/063148, filed May 16, 2022, which International Application claims benefit of priority to European Patent Application No. 21174397.6, filed May 18, 2021.

FIELD OF THE INVENTION

The invention relates to a method for providing a composition selected from the group consisting of organic solvent-based pastes, inks, paints and coating formulations with retroreflective properties. The invention further relates to said method further comprising the step of applying the retroreflective composition to a substrate.

BACKGROUND OF THE INVENTION

Retroreflective effects are used in a variety of applications. For example to improve the visibility of road signs, road markers, textiles, cars, et cetera, under dark conditions, or simply to improve their visual appearance. Road markers are typically provided with retroreflective properties by adding spherical glass beads having a specific refractive index. Retroreflection occurs by the tandem action of refraction of the incident light through the upper surface of a spherical glass bead, internal reflection from the lower onside surface of the spherical glass bead and subsequent refraction of the light as it exits the upper surface of the spherical glass bead, travelling back to the direction from which the impinging light came.

WO2004/017104A2 discloses retroreflective compositions comprising retroreflective microspheres, a binder system and a thixotropic blend comprising at least two thixotropic agents in an amount of from about 2 to about 5 wt. %, based on the retroreflective composition. The retroreflective compositions are intended to be used as paints, inks and coatings and are applied to a substrate using aerosols applicators with a propellant.

WO00/42113A1 concerns retroreflective inks comprising microbeads in a liquid carrier medium. The inks are intended for screen printing on textile.

Organic solvent-based pastes, paints, inks and coating formulations are commercially offered by many suppliers in different colours and/or tailored for different applications. Every new application and every modification of an organic solvent-based paste, paint, ink or coating formulation requires a costly and time-consuming development process, from lab sample to commercial product. Obviously, offering many products in different colours and/or for different applications requires a big warehouse and large stockpiles to be able to quickly respond to customer orders.

As explained supra, adding retroreflective properties to pastes, paints, inks and coating formulations may be advantageous because it results in an improved visibility and/or a more appealing visual appearance.

Developing retroreflective versions of already commercially available organic solvent-based pastes, paints, inks and coating formulations also requires a costly and time-consuming development process, because adding additional components, including retroreflective spherical glass beads, should not substantially affect the processability of the already existing paste, paint, ink or coating formulation, let alone the properties of the paste, paint, ink or coating formulation after drying or curing. Offering retroreflective pastes, paints, inks and coating formulations, in addition to pastes, paints, inks and coating formulations without retroreflective properties, requires even a bigger warehouse.

Accordingly, there is a need for an efficient method to provide, on demand, organic solvent-based pastes, paints, inks and coating formulations, i.e. commercially available organic solvent-based pastes, paints, inks and coating formulations, with retroreflective properties without substantially changing the processability of the organic solvent-based paints, inks and coating formulations and without substantially affecting the properties of the paste, paint, ink or coating formulation after drying or curing.

As shown in the appended examples, the inventors have established that providing organic solvent-based pastes, paints, inks and coating formulations with retroreflective properties cannot be implemented by simply mixing the organic solvent-based paste, paint, ink or coating formulation with retroreflective spherical glass beads, because this results in inhomogeneity, air inclusion and/or instability as regards the distribution of the spherical glass beads across the composition.

It is therefore an object of the present invention to provide an efficient method for providing organic solvent-based pastes, paints, inks and coating formulations with retroreflective properties without substantially changing the processability of the organic solvent-based pastes paints, inks and coating formulations and/or without adversely affecting the properties of the paste, paint, ink or coating formulation after drying or curing.

It is a further object of the present invention to provide an efficient method for providing organic solvent-based pastes, paints, inks and coating formulations with retroreflective spherical glass beads resulting in a homogeneous and stable distribution of the retroreflective spherical glass beads across the composition.

SUMMARY OF THE INVENTION

The inventors have unexpectedly established that one or more of the objectives can be met by mixing the organic solvent-based paste, paint, ink or coating formulation without retroreflective properties with an organic solvent-based composition comprising retroreflective spherical glass beads and thickener(s), said organic solvent-based composition having a first Brookfield viscosity $\eta_2$ at a shear rate of 0.5 rpm of between 5 and 350 Pa·s and a second Brookfield viscosity $\eta_3$ at a shear rate of 20 rpm of between 100 and 5000 mPa·s, with the proviso that 13 is at least 2 times lower than 12, wherein 12 and 13 are measured at a temperature of 20° C. with a #4 spindle, and by optionally subsequently adding additional thickener.

Accordingly, in a first aspect, the invention concerns a method for providing a composition selected from the group consisting of organic solvent-based pastes, inks, paints and coating formulations with retroreflective properties, said method comprising the steps of:

a) providing an organic solvent-based paste, ink, paint or coating formulation without retroreflective properties, said organic solvent-based paste, ink, paint or coating formulation having a Brookfield viscosity $\eta_1$, at a shear rate of 0.5 rpm and at a temperature of 20° C., of between:

1 mPa·s, as measured with a #1 spindle in a 600 ml beaker having a diameter of 8.25 cm; and 300 Pa·s, as measured with a #5 spindle in a 600 ml beaker having a diameter of 8.25 cm;

b) providing a retroreflective organic solvent-based composition having a first Brookfield viscosity $\eta_2$ at a shear rate of 0.5 rpm of between 5 and 350 Pa·s and a second Brookfield viscosity $\eta_3$ at a shear rate of 20 rpm of between 100 and 5000 mPa·s, with the proviso that 13 is at least 2 times lower than 12, wherein 12 and $\eta_3$ are measured at a temperature of 20° C. with a #4 spindle in a 600 ml beaker having a diameter of 8.25 cm, and wherein the retroreflective organic solvent-based composition consists of, based on the total weight of the retroreflective organic solvent-based composition:

10-49.85 wt. % of organic solvent;

50-85 wt. % of spherical glass beads having a median particle diameter D50, as measured with laser diffraction, between 1 and 1500 μm, and a refractive index, measured at a wavelength $\lambda$ of 589 nm, between 1.5 and 2.8;

0.15-3.5 wt. % of thickener; and 0-10 wt. % of one or more further ingredients;

c) mixing the organic solvent-based ink, paint or coating formulation without retroreflective properties provided in step (a) with the retroreflective organic solvent-based composition provided in step (b) in a weight ratio of between 30:70 to 70:30, to provide an organic solvent-based paste, ink, paint or coating formulation with retroreflective properties;

d) optionally mixing the organic solvent-based paste, ink, paint or coating formulation with retroreflective properties obtained in step (c) with 0-4.5 wt. %, based on the total weight of the organic solvent-based paste, ink, paint or coating formulation with retroreflective properties obtained in step (c), of synthetic pigment flakes having an average diameter of between 5 and 150 μm, a thickness smaller than 1 μm, and an aspect ratio of at least 10; and e) optionally mixing the mixture obtained in step (c) or (d) with 0-3 wt. %, based on the total weight of the organic solvent-based paste, ink, paint or coating formulation with retroreflective properties obtained in step (c) or (d) respectively, of thickener.

The retroreflective organic solvent-based composition provided in step (b) mainly consists of organic solvent and spherical glass beads. The inert spherical glass beads do not or only hardly influence the organic solvent-based paste, ink, paint or coating formulation. As such, these systems are highly compatible with 'commercial' organic solvent-based paste, ink, paint or coating formulations. Organic solvent disappears from the paste, ink, paint or coating formulation with drying or curing. The inventors have established that the processability of the organic solvent-based pastes, paints, inks and coating formulations provided in step (a) is hardly changed when the retroreflective organic solvent-based composition as defined in step (b) is added in suitable amounts, with optional addition of thickener. Since the retroreflective spherical glass beads are added in the form of a sufficiently stable and homogeneous organic solvent-based composition as defined in step (b), they can be added to the organic solvent-based paste, ink, paint or coating formulation without retroreflective properties as defined in step (a) without air inclusion, resulting in a sufficiently stable and homogeneous organic solvent-based paste, ink, paint or coating formulation with retroreflective properties.

Definitions

The term 'shear thinning behaviour' in the context of the retroreflective organic solvent-based composition provided in step (b) of the process as defined herein relates to a reduction of the viscosity when the composition, initially being in a static situation, is subjected to a shear rate.

DETAILED DESCRIPTION

In a first aspect, the invention concerns a method for providing a composition selected from the group consisting of organic solvent-based pastes, inks, paints and coating formulations with retroreflective properties, said method comprising the steps of:

a) providing an organic solvent-based paste, ink, paint or coating formulation without retroreflective properties, said organic solvent-based paste, ink, paint or coating formulation having a Brookfield viscosity $\eta_1$, at a shear rate of 0.5 rpm and at a temperature of 20° C., of between:

1 mPa·s, as measured with a #1 spindle in a 600 ml beaker having a diameter of 8.25 cm; and 300 Pa·s, as measured with a #5 spindle in a 600 ml beaker having a diameter of 8.25 cm;

b) providing a retroreflective organic solvent-based composition having a first Brookfield viscosity $\eta_{12}$ at a shear rate of 0.5 rpm of between 5 and 350 Pa·s and a second Brookfield viscosity $\eta_3$ at a shear rate of 20 rpm of between 100 and 5000 mPa·s, with the proviso that $\eta_3$ is at least 2 times lower than $\eta_2$, wherein $\eta_2$ and $\eta_3$ are measured at a temperature of 20° C. with a #4 spindle in a 600 ml beaker having a diameter of 8.25 cm, and wherein the retroreflective organic solvent-based composition consists of, based on the total weight of the retroreflective organic solvent-based composition:

10-49.85 wt. % of organic solvent;

50-85 wt. % of spherical glass beads having a median particle diameter D50, as measured with laser diffraction, between 1 and 1500 μm, and a refractive index, measured at a wavelength 2 of 589 nm, between 1.5 and 2.8;

0.15-3.5 wt. % of thickener; and 0-10 wt. % of one or more further ingredients;

c) mixing the organic solvent-based ink, paint or coating formulation without retroreflective properties provided in step (a) with the retroreflective organic solvent-based composition provided in step (b) in a weight ratio of between 30:70 to 70:30, to provide an organic solvent-based paste, ink, paint or coating formulation with retroreflective properties;

d) optionally mixing the organic solvent-based paste, ink, paint or coating formulation with retroreflective properties obtained in step (c) with 0-4.5 wt. %, based on the total weight of the organic solvent-based paste, ink, paint or coating formulation with retroreflective properties obtained in step (c), of synthetic pigment flakes having an average diameter of between 5 and 150 μm, a thickness smaller than 1 μm, and an aspect ratio of at least 10; and e) optionally mixing the mixture obtained in step (c) or (d) with 0-3 wt. %, based on the total weight of the organic solvent-based paste, ink, paint or coating formulation with retroreflective properties obtained in step (c) or (d) respectively, of thickener.

In a very preferred embodiment, the first aspect concerns a method for providing a composition selected from the group consisting of organic solvent-based pastes, inks, paints and coating formulations with retroreflective properties, said method comprising the steps of:

a) providing an organic solvent-based paste, ink, paint or coating formulation without retroreflective properties, said organic solvent-based paste, ink, paint or coating formulation having a Brookfield viscosity $\eta_1$, at a shear rate of 0.5 rpm and at a temperature of 20° C., of between:
   1 mPa·s, as measured with a #1 spindle in a 600 ml beaker having a diameter of 8.25 cm; and
   300 Pa·s, as measured with a #5 spindle in a 600 ml beaker having a diameter of 8.25 cm;
b) providing a retroreflective organic solvent-based composition having a first Brookfield viscosity $\eta_2$ at a shear rate of 0.5 rpm of between 5 and 350 Pa·s and a second Brookfield viscosity $\eta_3$ at a shear rate of 20 rpm of between 100 and 5000 mPa·s, with the proviso that $\eta_3$ is at least 2 times lower than $\eta_2$, wherein $\eta_2$ and $\eta_3$ are measured at a temperature of 20° C. with a #4 spindle in a 600 ml beaker having a diameter of 8.25 cm, and wherein the retroreflective organic solvent-based composition consists of, based on the total weight of the retroreflective organic solvent-based composition:
   15-49.85 wt. % of organic solvent;
   50-80 wt. % of spherical glass beads having a median particle diameter D50, as measured with laser diffraction, between 5 and 1500 μm, and a refractive index, measured at a wavelength λ of 589 nm, between 1.5 and 2.8;
   0.15-3.5 wt. % of thickener; and
   0-10 wt. % of one or more further ingredients;
c) mixing the organic solvent-based ink, paint or coating formulation without retroreflective properties provided in step (a) with the retroreflective organic solvent-based composition provided in step (b) in a weight ratio of between 30:70 to 70:30, to provide an organic solvent-based paste, ink, paint or coating formulation with retroreflective properties;
d) optionally mixing the organic solvent-based paste, ink, paint or coating formulation with retroreflective properties obtained in step (c) with 0-4.5 wt. %, based on the total weight of the organic solvent-based paste, ink, paint or coating formulation with retroreflective properties obtained in step (c), of synthetic pigment flakes having an average diameter of between 5 and 150 μm, a thickness smaller than 1 μm, and an aspect ratio of at least 10; and
e) optionally mixing the mixture obtained in step (c) or (d) with 0-3 wt. %, based on the total weight of the organic solvent-based paste, ink, paint or coating formulation with retroreflective properties obtained in step (c) or (d) respectively, of thickener.

As will be appreciated by those skilled in the art, limited sedimentation, (phase) separation and/or syneresis of the retroreflective organic solvent-based compositions provided in step (b) of the process as defined herein is no problem if said compositions can be resuspended, e.g. using simple stirring, to obtain compositions that remain homogeneous for a sufficiently long time to process them (i.e. to mix them with the organic solvent-based paste, ink, paint or coating formulation without retroreflective properties as provided in step (a) of the process as defined herein). Likewise, limited sedimentation, (phase) separation and/or syneresis of the organic solvent-based pastes, inks, paints or coating formulations with retroreflective properties provided in step (c), (d) or (e) of the process as defined herein is no problem if said compositions can be resuspended, e.g. using simple stirring, to obtain compositions that remain stable and homogeneous for a sufficiently long time to process them (i.e. to apply them to a substrate of interest).

As shown in the appended examples, both the retroreflective organic solvent-based compositions provided in step (b) of the process as defined herein and the organic solvent-based pastes, inks, paints or coating formulations with retroreflective properties provided in step (c), (d) or (e) of the process as defined herein remain stable and homogeneous for a sufficiently long time to process them In step (c), the organic solvent-based paste, ink, paint or coating formulation provided in step (a) is preferably mixed with the retroreflective organic solvent-based composition provided in step (b) in a weight ratio of between 60:40 to 40:60, more preferably in a weight ratio of between 45:55 to 55:45.

In preferred embodiments, the method as defined herein further comprises the step of applying the organic solvent-based paste, ink, paint or coating formulation with retroreflective properties obtained in step (c), (d) or (e) to a substrate using screen printing, curtain coating, spray coating or spray painting.

In a preferred embodiment, steps (c), (d) and (e) are performed at a temperature between 15 and 30° C. under stirring. Stirring is preferably performed at low shear rates to avoid the inclusion of air bubbles. In another preferred embodiment, step (c) comprises adding the retroreflective organic solvent-based composition provided in step (b) to the organic solvent-based paste, ink, paint or coating formulation without retroreflective properties provided in step (a).

The synthetic pigment flakes that are added in optional step (d) are preferably chosen from the synthetic pigment flakes as defined herein under 'further ingredients'.

Organic Solvent

The term 'organic solvent' as used herein concerns an organic solvent or a mixture of organic solvents that comprises less than 3 wt. % of water, preferably less than 2 wt. % of water, more preferably less than 1 wt. % of water, even more preferably less than 0.5 wt. % of water, most preferably no water.

Preferred organic solvents are chosen from the group consisting of aliphatic and aromatic solvents, ketones, esters, glycoethers, alcohols, halogenated hydrocarbons, and combinations thereof. Very preferred organic solvent are chosen from the group consisting of xylene (mixture of isomers), toluene, ethylbenzene, naphtha, 1,2,4-trimethylbenzene, mesitylene, n-propylbenzene, isopentyl acetate, n-butyl acetate, (2-methoxymethylethoxy)propanol, 2-butoxyethyl acetate, 2-methylbutyl acetate, isobutanol, 1-butanol, 1-ethoxypropane-2-ol, 2,6-dimethyl-4-heptanone, 2-methoxy-1-methylethylacetate, 4,6-dimethyl-heptane-2-one, 4-methyl-2-pentanone, 1-methoxy-2-propanol, 1-methoxy-2-propylacetate, 2-(2-butoxyethoxy)ethanol, 2-butoxyethanol, 5-methylhexane-2-one, ethyl acetate and combinations thereof.

In a very preferred embodiment, the amount of the organic solvent is 15-49.85 wt. %, based on the total weight of the retroreflective organic solvent-based composition provided in step (b).

In a preferred embodiment, the amount of the organic solvent is 20-45 wt. %, more preferably 25-40 wt. %, even more preferably 28-35 wt. %, based on the total weight of the retroreflective organic solvent-based composition provided in step (b).

In embodiments, the amount of the organic solvent is 15-48 wt. %, 15-45 wt. %, 15-42 wt. %, 15-40 wt. % or 15-38 wt. %, based on the total weight of the retroreflective organic solvent-based composition provided in step (b).

In embodiments, the amount of the organic solvent is 10-48 wt. %, 10-45 wt. %, 10-42 wt. %, 10-40 wt. % or 10-38 wt. %, based on the total weight of the retroreflective organic solvent-based composition provided in step (b).

In other embodiments, the amount of the organic solvent is 20-49.85 wt. %, 24-49.85 wt. %, 26-49.85 wt. %, 28-49.85 wt. %, 29-49.85 wt. % or 30-49.85 wt. %, based on the total weight of the retroreflective organic solvent-based composition provided in step (b).

Spherical Glass Beads

As defined hereinbefore, the refractive index of the spherical glass beads, measured at a wavelength 2 of 589 nm, is between 1.5 and 2.8.

In a preferred embodiment, the spherical glass beads have a refractive index, measured at a wavelength $\lambda$ of 589 nm, of between:

(a) 2.0 and 2.8, preferably between 2.1 and 2.4; or (b) 1.7 and 2.1, preferably between 1.8 and 2.0.

In preferred embodiments, the term 'glass' in 'spherical glass beads' as used herein refers to non-crystalline, amorphous solid and transparent material made of oxides. In other embodiments, the term 'glass' in 'spherical glass beads' refers to solid and transparent material made of oxides and containing some microcrystallinity. The refractive index of the spherical glass beads is closely related to the density of the glass, although the relationship is not linear. Because of the nature of glass, the density is approximately an additive function of its composition. Densities of spherical glass beads having refractive indices between 1.5 and 2.8 typically vary between 2.5 and 4.5 g/cm$^3$.

Oxides that can be used in glass are oxides of silicon, boron, aluminium, sodium, barium, vanadium, titanium, lanthanum, strontium, zirconium, potassium, magnesium, iron, calcium, zinc, lithium, barium and lead. The spherical glass beads can for example comprise different combinations of silica ($SiO_2$), boric oxide ($B_2O_3$), phosphorous pentoxide ($P_2O_5$), vanadium pentoxide ($V_2O_5$), arsenic trioxide ($As_2O_3$), germanium oxide ($GeO_2$), calcium oxide (CaO), sodium oxide ($Na_2O$), magnesium oxide (MgO), zinc oxide (ZnO), aluminium oxide ($Al_2O_3$), potassium oxide ($K_2O$), iron oxide ($Fe_2O_3$), lead oxide (PbO), barium oxide (BaO), barium titanate ($BaTiO_3$), titanium oxide ($TiO_2$), lithium oxide ($Li_2O$), strontium oxide (SrO), lanthanum oxide ($La_2O_3$), and zirconium oxide ($ZrO_2$). Silica and boric oxide are generally the lowest in density. Glasses containing large weight percentages of these oxide therefore generally result in glass beads with low refractive indices. The refractive indices can be increased by adding oxides with higher molecular weights. Preferably, the spherical glass beads do not comprise PbO.

Glass beads having refractive indices in the range of 1.5-2.51 and their composition in terms of oxides are disclosed in WO2014/109564A1, which is incorporated herein by reference in its entirety. PbO-free transparent glass beads with refractive indices of above 2.15 are disclosed in U.S. Pat. No. 4,082,427, which is incorporated herein by reference in its entirety.

The spherical glass beads may be coloured spherical glass beads as long as they remain transparent. Both coloured spherical glass beads made from coloured transparent glass and spherical glass beads provided with a concentric transparent coloured coating are encompassed by the invention. The colour may be the natural colour caused by the composition of the oxides or may be deliberately chosen by adding ingredients having a specific colour. Coloured glass beads having high refractive indices and high transparency are disclosed in WO2014/109564A1.

Accordingly, in an embodiment, at least part of the spherical glass beads are spherical glass beads made from coloured transparent glass and/or at least part of the spherical glass beads is provided with a concentric transparent coloured coating.

The spherical glass beads have a median particle diameter D50, as measured with laser diffraction. Accordingly, the median particle diameter D50 is a volume median, based on a volume distribution. The median particle diameter D50 is the diameter where half of the population of spherical glass beads lies below. This volume median particle diameter is often referred to in the art as Dv50 or $D_{v0.5}$.

In a very preferred embodiment, the spherical glass beads have a median particle diameter D50, as measured with laser diffraction, between 5 and 1500 μm.

In an embodiment, the spherical glass beads have a median particle diameter D50, as measured with laser diffraction, between 25 and 100 μm, preferably between 30 and 75 μm, more preferably between 35 and 50 μm.

In a preferred embodiment, the spherical glass beads have a median particle diameter D50, as measured with laser diffraction, between 5 and 100 μm, such as between 5 and 75 μm, between 5 and 50 μm, between 5 and 45 μm, between 5 and 40 μm or between 5 and 35 μm.

In a preferred embodiment, the spherical glass beads have a median particle diameter D50, as measured with laser diffraction, between 1 and 100 μm, such as between 1 and 75 μm, between 1 and 50 μm, between 1 and 45 μm, between 1 and 40 μm, between 1 and 35 μm, between 1 and 30 μm, between 1 and 25 μm, between 1 and 20 μm, between 1 and 15 μm or between 1 and 10 μm.

In yet another embodiment, the spherical glass beads have a median particle diameter D50, as measured with laser diffraction, between 25 and 150 μm, such as between 50 and 150 μm, between 75 and 150 μm, between 100 and 150 μm, between 110 and 150 μm or between 115 and 150 μm.

In still another embodiment, the spherical glass beads have a median particle diameter D50, as measured with laser diffraction, between 5 and 1400 μm, such as between 5 and 1200 μm, between 5 and 1000 μm, between 5 and 800 μm, between 5 and 500 μm or between 5 and 300 μm.

In yet another embodiment, the spherical glass beads have a median particle diameter D50, as measured with laser diffraction, between 1 and 1400 μm, such as between 1 and 1200 μm, between 1 and 1000 μm, between 1 and 800 μm, between 1 and 500 μm or between 1 and 300 μm.

The diameters D10 and D90 are often referred to in the art as Dv10 or $D_{v0.1}$ and Dv90 or $D_{v0.9}$, respectively. The D10 diameter is the diameter where 10% of the population of spherical glass beads lies below. Similarly, the D90 diameter is the diameter where 90% of the population of spherical glass beads lies below.

The span, as measured by laser diffraction, of the particle size distribution of the spherical glass beads is defined by:

$$\text{span} = \frac{D90 - D10}{D50}$$

In another embodiment, the spherical glass beads have a median particle diameter D50, as measured with laser diffraction, between 15 and 100 μm and a span between 0 and 1.9, such as between 0 and 1.5, between 0 and 1, between 0 and 0.5, between 0 and 0.2 or between 0 and 0.1.

In still another embodiment, the spherical glass beads have a median particle diameter D50, as measured with laser diffraction, between 30 and 75 μm and a span between 0 and 1.9, such as between 0 and 1.5, between 0 and 1, between 0 and 0.5, between 0 and 0.2 or between 0 and 0.1.

In another preferred embodiment, the spherical glass beads have a median particle diameter D50, as measured with laser diffraction, between 15 and 50 μm and a span between 0 and 1.9, such as between 0 and 1.5, between 0 and 1, between 0 and 0.5, between 0 and 0.2 or between 0 and 0.1.

In yet another preferred embodiment, the spherical glass beads have a median particle diameter D50, as measured with laser diffraction, between 5 and 35 μm and a span between 0 and 1.9, such as between 0 and 1.5, between 0 and 1, between 0 and 0.5, between 0 and 0.2 or between 0 and 0.1.

In yet another preferred embodiment, the spherical glass beads have a median particle diameter D50, as measured with laser diffraction, between 1 and 35 μm and a span between 0 and 1.9, such as between 0 and 1.5, between 0 and 1, between 0 and 0.5, between 0 and 0.2 or between 0 and 0.1.

In still another preferred embodiment, the spherical glass beads have a median particle diameter D50, as measured with laser diffraction, between 10 and 25 μm and a span between 0 and 1.9, such as between 0 and 1.5, between 0 and 1, between 0 and 0.5, between 0 and 0.2 or between 0 and 0.1.

In still another preferred embodiment, the spherical glass beads have a median particle diameter D50, as measured with laser diffraction, between 1 and 25 μm and a span between 0 and 1.9, such as between 0 and 1.5, between 0 and 1, between 0 and 0.5, between 0 and 0.2 or between 0 and 0.1.

In still another preferred embodiment, the spherical glass beads have a median particle diameter D50, as measured with laser diffraction, between 1 and 15 μm and a span between 0 and 1.9, such as between 0 and 1.5, between 0 and 1, between 0 and 0.5, between 0 and 0.2 or between 0 and 0.1.

In still another preferred embodiment, the spherical glass beads have a median particle diameter D50, as measured with laser diffraction, between 1 and 10 μm and a span between 0 and 1.9, such as between 0 and 1.5, between 0 and 1, between 0 and 0.5, between 0 and 0.2 or between 0 and 0.1.

As will be appreciated by those skilled in the art, span=0 corresponds to monodisperse spherical glass beads.

In a preferred embodiment, at least part of the spherical glass beads are hemispherically coated with a light-reflective coating, preferably with a hemispherical aluminium coating (HAC). In another embodiment, at least part of the spherical glass beads is fluoro-chemically coated.

The particular application of the organic solvent-based ink, coating or paint composition with retroreflective properties provided in step (c), (d) or (e) determines the optimum refractive index of the spherical glass beads used in the retroreflective organic solvent-based composition provided in step (b). If the composition is to be applied in a dry environment or onto a substrate that is to show retroreflectivity under dry conditions and wherein the applied layer of retroreflective spherical glass beads is not coated by a further layer, the refractive index of the spherical glass beads, measured at a wavelength λ of 589 nm, can be between 1.8 and 2.8.

In an embodiment, the retroreflective organic solvent-based composition provided in step (b) and the organic solvent-based ink, coating or paint composition with retroreflective properties provided in step (c), (d) or (e) comprise spherical glass beads having a refractive index, measured at a wavelength λ of 589 nm, between 1.8 and 2.0.

If, on the other hand, the composition is to be applied in a wet environment or onto a substrate that is to show retroreflectivity under wet conditions or the applied layer of retroreflective spherical glass beads is coated by one or more further transparent layers, the refractive index of the spherical glass beads, measured at a wavelength λ of 589 nm, preferably is between 2.0 and 2.8, more preferably between 2.2 and 2.4. Compositions that are to show retroreflectivity under both dry and wet conditions and wherein the applied layer of retroreflective spherical glass beads is coated or is not coated by one or more further transparent layers can comprise different types of glass beads having different refractive indices, and optionally different sizes. In an embodiment, the retroreflective organic solvent-based composition provided in step (b) and the organic solvent-based ink, coating or paint composition with retroreflective properties provided in step (c), (d) or (e) comprise spherical glass beads having a refractive index, measured at a wavelength 2 of 589 nm, between 2.0 and 2.8, preferably between 2.2 and 2.4.

In another embodiment, the retroreflective organic solvent-based composition provided in step (b) and the organic solvent-based ink, coating or paint composition with retroreflective properties provided in step (c), (d) or (e) comprise at least two types of spherical glass beads wherein at least one type of spherical glass beads has a refractive index, measured at a wavelength λ of 589 nm, between 1.8 and lower than 2.0 and at least one further type of spherical glass beads has a refractive index, measured at a wavelength 2 of 589 nm, between 2.0 and 2.8.

In a very preferred embodiment, the amount of the spherical glass beads is 50-80 wt. %, based on the total weight of the retroreflective organic solvent-based composition provided in step (b).

In a preferred embodiment, the amount of the spherical glass beads is 53-75 wt. %, more preferably 58-72 wt. %, even more preferably 60-70 wt. %, based on the total weight of the retroreflective organic solvent-based composition provided in step (b).

In embodiments, the amount of the spherical glass beads is 50-78 wt. %, 50-75 wt. %, 50-73 wt. %, 50-72 wt. %, 50-71 wt. %, 50-70 wt. % or 50-69 wt. %, based on the total weight of the retroreflective organic solvent-based composition provided in step (b).

In other embodiments, the amount of the spherical glass beads is 52-80 wt. %, 54-80 wt. %, 56-80 wt. %, 57-80 wt. %, 58-80 wt. %, 59-80 wt. % or 60-80 wt. %, based on the total weight of the retroreflective organic solvent-based composition provided in step (b).

In yet other embodiments, the amount of the spherical glass beads is 52-85 wt. %, 54-85 wt. %, 56-85 wt. %, 57-85 wt. %, 58-85 wt. %, 59-85 wt. % or 60-85 wt. %, based on the total weight of the retroreflective organic solvent-based composition provided in step (b).

Thickener

The retroreflective organic solvent-based composition provided in step (b) of the method as defined herein comprises thickener. This can be the same thickener that is (optionally) applied in step (e). The term thickener as used herein can also mean a combination of one or more thickeners. Accordingly, thickener and thickeners are both used and have the same meaning, unless indicated otherwise.

In an embodiment, a single thickener is used in the retroreflective organic solvent-based composition provided in step (b). In another embodiment, a single thickener is used in step (e).

In preferred embodiments, the thickener encompasses a mixture of different thickeners. In an embodiment, a mixture of different thickeners is used in the retroreflective organic solvent-based composition provided in step (b). In another embodiment, a mixture of different thickeners is used in step (e).

In embodiments, the thickener applied in step (e) is the same thickener applied in the retroreflective organic solvent-based composition provided in step (b). In other embodiments, the thickener applied in step (e) is different from the thickener applied in the retroreflective organic solvent-based composition provided in step (b).

As will be appreciated by the skilled person, the organic solvent-based paste, ink, paint or coating formulation without retroreflective properties provided in step (a) may also comprise thickener. If present, this thickener may be the same as the thickener applied in step (b) and/or the thickener applied in step (e), or different.

Without wishing to be bound by any theory, it is believed that the thickener limits or reduces settling and/or sedimentation of the spherical glass beads and optionally of further particulate matter in the retroreflective organic solvent-based composition provided in step (b) and in the final organic solvent-based pastes, inks, paints or coating formulations with retroreflective properties provided in step (c), (d) or (e), so that these compositions can be easily resuspended. Moreover, again without wishing to be bound by any theory, it is believed that the thickener provides the retroreflective organic solvent-based composition provided in step (b) with shear-thinning behaviour.

In a preferred embodiment, the amount of thickener in the retroreflective organic solvent-based composition provided in step (b) is 0.20-3.0 wt. %, more preferably 0.25-2.5 wt. %, even more preferably 0.30-2.1 wt. %, based on the total weight of the retroreflective organic solvent-based composition provided in step (b).

In embodiments, the amount of thickener in the retroreflective organic solvent-based composition provided in step (b) is 0.15-2.5 wt. %, 0.15-2.0 wt. %, 0.15-1.75 wt. %, 0.15-1.5 wt. % or 0.15-1.3 wt. %, based on the total weight of the retroreflective organic solvent-based composition provided in step (b).

In other embodiments, the amount of the thickener in the retroreflective organic solvent-based composition provided in step (b) is 0.20-3.50 wt. %, 0.30-3.50 wt. %, 0.40-3.50 wt. %, 0.50-3.50 wt. %, 0.60-3.50 wt. %, 0.70-3.50 wt. % or 0.80-3.50 wt. %, based on the total weight of the retroreflective organic solvent-based composition provided in step (b).

In a preferred embodiment, the mixture obtained in step (c) or (d) is mixed in step (e) with 0-2.5 wt. %, 0-2.0 wt. %, 0-1.8 wt. %, 0-1.6 wt. %, 0-1.5 wt. %, 0-1.4 wt. % or 0-1.3 wt. %, based on the total weight of the organic solvent-based paste, ink, paint or coating formulation with retroreflective properties obtained in step (c) or (d) respectively, of thickener.

In another preferred embodiment, the mixture obtained in step (c) or (d) is mixed in step (e) with 0.1-3.0 wt. %, 0.2-3.0 wt. %, 0.3-3.0 wt. %, 0.4-3.0 wt. %, or 0.5-3.0 wt. %, based on the total weight of the organic solvent-based paste, ink, paint or coating formulation with retroreflective properties obtained in step (c) or (d) respectively, of thickener.

Preferred examples of thickeners that can be used in the retroreflective organic solvent-based composition provided in step (b) and/or in step (e) are chosen from the group consisting of (modified) hydrogenated castor oil, clay, modified clay, calcium sulphonate complex, organophilic phyllosilicate, silica-gel, synthetic amorphous silica, acrylic acid type gellants, modified cellulosic materials, polyurea dispersions, solutions of urea-modified polyamides, polyurethane dispersions and combinations thereof.

Examples of modified clay includes BENTONE® LT and BENTONE® 38 (Elementis Global). Examples of a silica-gel include HDK® N20 (Wacker Chemical Corporation) and AEROSIL® (Evonik). An example of organophilic phyllosilicate is Claytone 40 (Byk). An example of a modified hydrogenated castor oil is Efka® RM 1900 (BASF). An example of a hydrogenated castor oil is Efka® RM 1920 (BASF). An example of a solution of a urea-modified non-polar polyamide in isobutanol/monophenyl glycol is Rheobyk-431 (Byk). An example of a solution of a urea-modified polyamide of medium polarity in isobutanol/solvent naphtha is Rheobyk-430 (Byk). An example of synthetic amorphous silica is Zeothix® 95 (Huber).

In a preferred embodiment, two thickeners are used in the retroreflective organic solvent-based composition provided in step (b) and/or in step (e), more preferably:

- an organophilic phyllosilicate and a modified hydrogenated castor oil; or
- a calcium sulphonate complex and a polyurea dispersion.

The amount of organic solvent in the retroreflective organic solvent-based composition provided in step (b) is independently specified. If thickener is applied in the form of for example a dispersion in solvent, the amount of thickener defined in the context of step (b) concerns the dry weight of the thickener. If thickener is applied in the form of for example a dispersion in solvent in step (e), the amount of thickener defined in the context of step (e) concerns the dry weight.

Further Ingredients

As described hereinbefore, the retroreflective organic solvent-based composition provided in step (b) comprises 0-10 wt. % of one or more further ingredients. As will be appreciated by the skilled person, the 'further' ingredients are different from the other ingredients defined in the retroreflective organic solvent-based composition provided in step (b). In other words, the further ingredients do not comprise spherical glass beads, thickener and organic solvent.

In an embodiment, the one or more further ingredients are chosen from the group consisting of foam control agents, preservatives, dyes, curing initiators, luminescent agents such as phosphorescent agents and fluorescent agents, pigments, UV-absorbers, binders and resins.

Suitable binders and resins for compositions based on organic solvents are generally known to the skilled person. The binder or resin can be radiation-curable. If the binder or resin is radiation curable, the further ingredients can comprise a curing initiator, such as a photoinitiator or a thermal initiator.

In an embodiment, the one or more further ingredients do not comprise any one of dyes, pigments, binders, resins and curing initiators.

In a preferred embodiment, the one or more further ingredients do not comprise any one of binders, resins and curing initiators.

In an embodiment, the retroreflective organic solvent-based composition provided in step (b) comprises, as part of the one or more further ingredients, synthetic pigment flakes having an average diameter of between 5 and 150 μm, a thickness smaller than 1 μm, and an aspect ratio (flake diameter/thickness) of at least 10, wherein said synthetic pigment flakes are chosen from (A), (B), (C) or a combination thereof:

(A) Metal flakes or synthetic mica flakes, optionally coated with at least one layer of one or more components chosen from the group consisting of metal oxides, metals, metal sulphides, titanium suboxides, titanium oxynitrides, FeO(OH), $SiO_2$, $B_2O_3$, $GeO_2$, $MgF_2$, metal alloys, rare earth compounds, and optionally coated with an outer layer comprising one or more colourants and a binder;

(B) Flakes comprising $Al_2O_3$, $SiO_2$, glass, ceramics, graphite or mica platelets coated with at least one layer of one or more components chosen from the group consisting of metal oxides, metals, metal sulphides, titanium suboxides, titanium oxynitrides, FeO(OH), $SiO_2$, $B_2O_3$, $GeO_2$, metal alloys, rare earth compounds, and optionally coated with an outer layer comprising one or more colourants and a binder;

(C) Flakes comprising $Al_2O_3$ platelets doped with one or more components chosen from the group consisting of $TiO_2$, $ZrO_2$, $SiO_2$, $SnO_2$, $In_2O_3$, ZnO and iron oxide, coated with at least one layer of one or more components chosen from the group consisting of metal oxides, metals, metal sulphides, titanium suboxides, titanium oxynitrides, FeO(OH), $SiO_2$, $B_2O_3$, $GeO_2$, metal alloys, rare earth compounds, and optionally coated with an outer layer comprising one or more colourants and a binder.

The term 'average diameter' in the context of the synthetic pigment flakes refers to the median particle diameter D50.

As will be appreciated by those skilled the art, the term 'synthetic' in 'synthetic pigment flakes' means that the pigment flakes are not pigment flakes naturally occurring, but they are pigment flakes that have been chemically manufactured or naturally occurring pigment flakes that have been chemically/physically processed. One of the advantages of using synthetic pigment flakes is that they can be produced with very smooth surfaces, thereby increasing their reflective properties.

The terms 'flake' or 'platelet' as used herein refers to the shape of pigments having a large surface area and a small thickness. Typically, flakes or platelets are characterized by their 'aspect ratio', being defined as the largest dimension, i.e. the largest diameter of the surface, divided by the smallest dimension, i.e. the thickness. The synthetic pigment flakes as used herein have and aspect ratio of at least 10, preferably at least 15, more preferably at least 20.

In a preferred embodiment, the average diameter of the synthetic flakes is 6-45 μm, more preferably 7-35 μm, even more preferably 8-25 μm, still more preferably 9-20 μm, most preferably 10-16 μm.

In a preferred embodiment, the thickness of the synthetic flakes is between 10 nm and 800 nm, more preferably between 15 nm and 600 nm. In another preferred embodiment, the thickness of the synthetic flakes is between 10 and 200 nm, more preferably between 10 and 150 nm, even more preferably between 10 and 100 nm, still more preferably between 10 and 50 nm.

In embodiments, the amount of the one or more further ingredients in the retroreflective organic solvent-based composition provided in step (b) is 0-8.0 wt. %, 0-6.0 wt. %, 0-4.0 wt. %, 0-3.0 wt. %, 0-2.5 wt. %, 0-2.0 wt. %, 0-1.5 wt. %, 0-1.0 wt. % or 0-0.5 wt. %, based on the total weight of the retroreflective organic solvent-based composition provided in step (b).

In other embodiments, the amount of the one or more further ingredients in the retroreflective organic solvent-based composition provided in step (b) is 0.01-10 wt. %, 0.02-10 wt. %, 0.04-10 wt. %, 0.08-10 wt. %, 0.15-10 wt. %, 0.25-10 wt. %, 0.35-10 wt. %, 0.45-10 wt. % or 0.55-10 wt. %, based on the total weight of the retroreflective organic solvent-based composition provided in step (b).

The amount of organic solvent in the retroreflective organic solvent-based composition provided in step (b) is independently specified. If one or more further ingredients is/are applied in the form of for example a solution, suspension or dispersion in a solvent, the amount of the one or more further ingredients defined hereinbefore concerns the dry weight of the of the one or more further ingredients, i.e. the weight without the solvent.

Rheological Behaviour

The viscosities as measured and defined herein are so-called Brookfield viscosities. As is known to the skilled person, Brookfield viscosities of different compositions may need to be measured with different standardized spindles. Compositions with very low viscosities are typically determined with spindle #1, whereas compositions with high viscosities are typically determined with spindle #5. Compositions with intermediate viscosities may be determined with spindle #2, #3 or #4.

The viscosity of the organic solvent-based paste, ink, paint or coating formulation without retroreflective properties provided in step (a) of the method as defined herein can vary from very low values to high values. That is why the lower limit of the Brookfield viscosity range is determined using spindle #1 and the upper value with spindle #5.

In a preferred embodiment, the organic solvent-based paste, ink, paint or coating formulation without retroreflective properties, said organic solvent-based paste, ink, paint or coating formulation having a Brookfield viscosity $\eta_1$ at a shear rate of 0.5 rpm and at a temperature of 20° ° C., of between:

5 mPa·s, more preferably 10 mPa·s, as measured with a #1 spindle in a 600 ml beaker having a diameter of 8.25 cm; and 280 Pa·s, more preferably 250 Pa·s, as measured with a #5 spindle in a 600 ml beaker having a diameter of 8.25 cm.

The retroreflective organic solvent-based composition provided in step (b) of the method as defined herein exhibits shear-thinning behaviour.

In a preferred embodiment, the retroreflective organic solvent-based composition provided in step (b) has a first Brookfield viscosity $\eta_2$ at a shear rate of 0.5 rpm of between 8 and 325 Pa·s and a second Brookfield viscosity $\eta_3$ at a shear rate of 20 rpm of between 110 and 4000 mPa·s, with the proviso that $\eta_3$ is at least 4 times lower than $\eta_2$, wherein $\eta_2$ and $\eta_3$ are measured at a temperature of 20° ° C. with a #4 spindle in a 600 ml beaker having a diameter of 8.25 cm.

In another preferred embodiment, the retroreflective organic solvent-based composition provided in step (b) has a first Brookfield viscosity $\eta_2$ at a shear rate of 0.5 rpm of between 10 and 310 Pa·s and a second Brookfield viscosity $\eta_3$ at a shear rate of 20 rpm of between 125 and 4000 mPa·s, with the proviso that $\eta_3$ is at least 5 times lower than $\eta_2$, wherein $\eta_2$ and $\eta_3$ are measured at a temperature of 20° C. with a #4 spindle in a 600 ml beaker having a diameter of 8.25 cm.

In another embodiment, the retroreflective organic solvent-based composition provided in step (b) has a first Brookfield viscosity $\eta_2$ at a shear rate of 0.5 rpm of between 5 and 350 Pa·s and a second Brookfield viscosity $\eta_3$ at a shear rate of 20 rpm of between 100 and 5000 mPa·s, with the proviso that 13 is at least 30, 50, 60, 70 or 80 times lower than $\eta_2$, wherein $\eta_2$ and $\eta_3$ are measured at a temperature of 20° C. with a #4 spindle in a 600 ml beaker having a diameter of 8.25 cm.

In another embodiment, the retroreflective organic solvent-based composition provided in step (b) has a first Brookfield viscosity $\eta_2$ at a shear rate of 0.5 rpm of between 5 and 25 Pa·s and a second Brookfield viscosity $\eta_3$ at a shear rate of 20 rpm of between 100 and 5000 mPa·s, with the proviso that $\eta_3$ is at least 2, 3, 4 or 5 times lower than $\eta_2$, wherein $\eta_2$ and $\eta_3$ are measured at a temperature of 20° C. with a #4 spindle in a 600 ml beaker having a diameter of 8.25 cm.

Process for the Preparation of the Retroreflective Organic Solvent-Based Composition The retroreflective organic solvent-based composition provided in step (b) can be prepared as follows. Generally speaking, the ingredients of the retroreflective organic solvent-based composition can be added in any order. It is however preferred to add the thickener at the end of the process, at least after adding the spherical glass beads to the organic solvent, since homogeneously distributing the ingredients is more difficult in a thickened composition.

In an embodiment, the retroreflective organic solvent-based composition provided in step (b) is prepared by:

(i) adding the organic solvent, the spherical glass beads as defined hereinbefore, the thickener as defined hereinbefore and the optional one or more further ingredients as defined hereinbefore, to a container; and (ii) stirring or homogenizing the mixture obtained in step (i), preferably at a temperature between 15 and 70° C., preferably for a period of between 5 and 60 minutes.

In a preferred embodiment, the thickener is added after stirring or homogenizing a mixture of organic solvent and spherical glass beads. In another preferred embodiment, the thickener is added after stirring or homogenizing a mixture of organic solvent, spherical glass beads and any further ingredients. Stirring or homogenization is preferably performed at low shear rates to avoid the inclusion of air bubbles.

Thus, the invention has been described by reference to certain embodiments discussed above. It will be recognized that these embodiments are susceptible to various modifications and alternative forms well known to those of skill in the art.

Furthermore, for a proper understanding of this document and its claims, it is to be understood that the verb 'to comprise' and its conjugations are used in its non-limiting sense to mean that items following the word are included, but items not specifically mentioned are not excluded. In addition, reference to an element by the indefinite article 'a' or 'an' does not exclude the possibility that more than one of the element is present, unless the context clearly requires that there be one and only one of the elements. The indefinite article 'a' or 'an' thus usually means 'at least one'.

EXAMPLES

Measuring Protocol Viscosity

Viscosities were measured using a Brookfield Ametek® DV2T viscometer at a temperature of 20° C. using different standardized spindles (#1, #2, #3, #4 and #5; LV-1, LV-2, LV-3, LV-4 and LV-5 obtained from Brookfield Ametek®) according to operating instructions. Measurements were performed in a 600 ml low form Griffin beaker with a flat bottom having a diameter of 8.25 cm, without using a guard leg. Before measuring the viscosity, the samples were brought to the temperature of 20° C. and were homogenized using stirring.

Example 1

Three retroreflective organic solvent-based composition were prepared (the compositions provided in step (b) of the process according to the invention) by adding ingredients at ambient temperature (~20° C.) in the following order to a container (3.5 liter) and using a Dispermill Orange-line 18/186:

(1) add organic solvent and start stirring at 500 rpm;

(2) add glass beads while mixing at 500 rpm for at least 5 minutes;

(3) add first thickener while mixing at 1300 rpm for at least 5 minutes and increase rpm slowly to 2000 rpm without introducing air bubbles;

(4) optionally add further thickener, and continue stirring for at least 45 minutes at 1800 rpm and further increase rpm slowly if necessary without introducing air bubbles; and (5) stir the composition the next day, after final setting of thickener(s), at about 2300 rpm for 15 minutes.

The amounts of the different ingredients is listed in Table 1. The following ingredients were used.

Spherical Glass Beads:

'(AA)' Micro glass beads (RI 2.2), obtained from Jianxi Sunflex Light Retroreflective Material Co, Ltd., having a refractive index of about 2.2, measured at a wavelength λ of 589 nm, having a median particle diameter D50 of 26.56 μm, a D10 diameter of 19.77 μm and a D90 diameter of 32.41 μm, as measured with laser diffraction, and a specific gravity of about 4.5 g/cm$^3$. These spherical glass beads comprise $TiO_2$, BaO, ZnO and CaO.

'(BB)' Micro glass beads (RI 2.2, HAC), obtained from Jianxi Sunflex Light Retroreflective Material Co, Ltd., hemispherically aluminium coated glass beads having a refractive index of about 2.2, measured at a wavelength 2 of 589 nm, having a median particle diameter D50 of 40.37 μm, a D10 diameter of 37.32 μm and a D90 diameter of 44.11 μm, as measured with laser diffraction, and a specific gravity of about 4.5 g/cm$^3$. These spherical glass beads comprise $TiO_2$, BaO, ZnO and CaO.

Organic Solvents

Syrox S8000 thinner (Axalta), mixture of organic solvents, comprising 5-methylhexane-2-one, n-butyl acetate, 2,6-dimethylheptane-4-one and 4,6-dimethylheptane-2-one OK thinner (Gamma, the Netherlands)

Cromax XB383 standard thinner (Axalta), comprising mixture of organic solvents, such as xylene, ethylbenzene, naphtha, 1,2,4-trimethylbenzeen, mesitylene, n-propylbenzene, isopentyl acetate, n-butyl acetate, 2-methylbutyl acetate and 4-methyl-2-pentanone Thickeners Efka® RM 1920, obtained from BASF, hydrogenated castor oil, fine powder, thickener Claytone 40, obtained from Byk, organophilic phyllosilicate, thickener

TABLE 1 composition retroreflective organic solvent-based compositions

| Ingredients | Sample T00980 amount [wt. %] | T00994 amount [wt. %] | T01039 amount [wt. %] |
|---|---|---|---|
| Organic solvent | | | |
| Syrox thinner S8000 | 32.44 | | |
| Cromax XB383 standard thinner | | 32.63 | |
| OK thinner Gamma | | | 32.63 |
| Subtotal organic solvent | 32.44 | 32.63 | 32.63 |
| Spherical glass beads | | | |
| AA | 65.55 | | 66.06 |
| BB | | 66.06 | |
| Subtotal spherical glass beads | 65.55 | 66.06 | 66.06 |
| Thickener | | | |
| Claytone 40 | 2.01 | 1.10 | 1.10 |
| EFKA ® RM 1920 | | 0.21 | 0.21 |
| Subtotal thickener | 2.01 | 1.31 | 1.31 |
| Total composition | 100.00 | 100.00 | 100.00 |

Example 2

Stability of the three retroreflective organic solvent-based compositions given in Table 1 was determined by visual and tactile inspection of whether the sample shows sedimentation, syneresis or separation (phase or otherwise) right before resuspension and whether the sample shows sedimentation, syneresis or separation (phase or otherwise) directly after resuspension of the mixture. Moreover, it was determined whether the samples remained stable and homogeneous for a sufficiently long time after resuspension.

As will be appreciated by those skilled in the art, limited sedimentation, (phase) separation and/or syneresis of the retroreflective organic solvent-based compositions provided in step (b) of the process according to the invention is no problem if said compositions can be resuspended, e.g. using simple stirring, to obtain compositions that remain stable and homogeneous for a sufficiently long time to process them (i.e. to mix them with the organic solvent-based paste, ink, paint or coating formulation without retroreflective properties as provided in step (a) of the process according to the invention).

Resuspension was performed by vigorous mechanical stirring for 5 minutes with an overhead stirrer (without introducing air bubbles). Results of stability measurements directly before and after resuspension are listed in Table 2a. Table 2a lists sedimentation, syneresis and 'air bubbles/agglomerates' values that are determined in accordance with the classifications given in Table 2b.

TABLE 2a stability results

| Sample | T00980 | T00994 | T01039 |
|---|---|---|---|
| Date of manufacturing | 12 Feb. 2021 | 19 Feb. 2021 | 9 Mar. 2021 |
| Date of previous resuspension | 16 Feb. 2021 | 22 Feb. 2021 | 10 Mar. 2021 |
| Date of present resuspension | 5 May 2021 | 5 May 2021 | 5 May 2021 |
| Days in between previous and present resuspension | 78 | 72 | 56 |
| Sedimentation value before resuspension | 3 | 4 | 3 |
| Syneresis value before resuspension | 2 | 3 | 2 |
| Air bubbles/agglomerates value before resuspension | 3 | 3 | 3 |
| 5 May 2021 Resuspension (rpm/min) | 3.600/10 | 2.300/6 | 2.000/10 |
| Sedimentation value after resuspension | 4 | 4 | 4 |
| Syneresis value after resuspension | 4 | 4 | 4 |
| Air bubbles/agglomerates value after resuspension | 3 | 3 | 3 |
| Duration 'stability' (hrs) after resuspension | >3 hrs | >3 hrs | >1 hrs (longer with light shaking) |

TABLE 2b stability classification

| | # |
|---|---|
| Sedimentation classification | |
| Severe sedimentation/not resuspendable | 1 |
| Moderate sedimentation/resuspension difficult | 2 |
| Light sedimentation/resuspension easy | 3 |
| No sedimentation/homogeneous | 4 |
| Severe syneresis | 1 |
| Moderate syneresis | 2 |
| Light syneresis | 3 |
| No syneresis | 4 |
| Air bubbles/agglomerates classification | |
| Unmixed glass agglomerates | 1 |
| Air bubbles | 2 |
| No air bubbles - no agglomerates | 3 |

The Brookfield viscosity of the three retroreflective organic solvent-based compositions given in Table 1 (provided in step (b) of the process according to the invention) was determined in accordance with the protocol as defined hereinbefore using spindle #4 at 0.5 rpm and 20 rpm. Results are presented in Table 2c. The three retroreflective organic solvent-based compositions show shear-thinning behaviour.

TABLE 2c

Brookfield viscosity using a #4 spindle at about 20° C.

| Sample | Viscosity at 0.5 rpm [Pa · s] | Viscosity at 20 rpm [mPa · s] |
|---|---|---|
| T00980 | 300.0 | 3500 |
| T00994 | 14.40 | 2790 |
| T01039 | 13.20 | 150 |

Example 3

The three retroreflective organic solvent-based compositions of Example 1 (provided in step (b) of the process according to the invention) were used in the preparation of five different compositions selected from the group consisting of organic solvent-based pastes, inks, paints or coating formulations with retroreflective properties.

The three retroreflective organic solvent-based compositions of Example 1 (provided in step (b) of the process according to the invention) were mixed with several commercial products without retroreflective properties listed in Table 3 (provided in step (a) of the process according to the invention). The viscosity of the commercial products is also shown in Table 3.

TABLE 3 commercial products without retroreflective properties

| Composition | Offered by | Purpose | Application method | Viscosity [Pa · s] |
|---|---|---|---|---|
| Cromax Verkehrsblau * | Cromax | Industrial use, car refinish | Spray HVLP | 1.740 § |
| TCI 8700 × 1 | AGA Color Solutions | Industrial use, screenprint | Screenprint | 12.48 §§ |
| Fortidur 7908 | Koopman Lakken | Industrial use, heavy duty paint | Paintbrush | 228.0 §§§ |
| Felgensilber | Vosschemie GmbH | Industrial use, wheel rim paint spraycan | Aerosol/spraycan | — §§§§ |
| Sikkens Q550 Autobase Plus MM mixture with Sikkens Q065 Autobase Plus MM ** | AKZO Nobel | Industrial use, car refinish | Spray HVLP (High volume low pressure) | 22.08 §§ |

§ Brookfield viscosity measured in accordance with the protocol as defined herein before using spindle #2 at 0.5 rpm.

§§ Brookfield viscosity measured in accordance with the protocol as defined herein before using spindle #3 at 0.5 rpm.

§§§ Brookfield viscosity measured in accordance with the protocol as defined herein before using spindle #5 at 0.5 rpm.

§§§§ Not determined.

* Cromax Verkehrsblau is a mixture of 42.15 wt. % XB155 Centari 6000 Low Emission Binder (Axalta), 5.47 wt. % XB165 Centari 6000 Low Emission Binder (Axalta), 29.91 wt. % Cromax AM28 Centari Mastertint Fast blue HS (Axalta), 12.76 wt. % Cromax AM1 Centari Mastertint White HS (Axalta), 7.59 wt. % Cromax AM27 Centari Mastertint Blue (Axalta) and 2.13 wt. % Cromax AM30 Centari Mastertint Fast Green HS (Axalta).

** Mixture of 75 wt. % Q550 Autobase Plus MM and 25 wt. % of Q065 Autobase Plus MM.

When needed, additional thickener (chosen from the thickeners listed in Example 1) was added.

The five compositions selected from the group consisting of organic solvent-based pastes, inks, paints or coating formulations with retroreflective properties were prepared by adding ingredients at ambient temperature (~20° C.) in the following order to a 600 ml beaker and using a Dispermill Orange-line 18/186:

(1) add the organic solvent-based paste, ink, paint or coating formulation without retroreflective properties (Table 3) to the beaker and start stirring;

(2) add the retroreflective organic solvent-based composition (Table 1) to the beaker and continue stirring for about 10 minutes at 700-1500 rpm;

(3) when additional thickener is added, extend stirring per addition for another 15 minutes at about 1800 rpm; and (4) stir the composition the next day, after final setting of thickeners, at about 1800-2500 rpm for 15 minutes.

The amounts of the different ingredients in the resulting organic solvent-based paste, ink, paint or coating formulation with retroreflective properties (provided in step (c) or (e) of the process according to the invention) are listed in Table 4.

TABLE 4 composition organic solvent-based paste, ink, paint or coating formulation with retroreflective properties

| Ingredients | Sample T01231 amount [wt. %] | T01232 amount [wt. %] | T01233 amount [wt. %] | T01234 amount [wt. %] | T01235 amount [wt. %] |
|---|---|---|---|---|---|
| Retroreflective organic solvent-based composition of Example 1 | | | | | |
| | T00980 | T00994 | T00994 | T01039 | T01039 |
| | 60.29 | 59.98 | 53.10 | 59.53 | 59.25 |
| Commercial organic solvent-based paste, ink, paint or coating formulation | | | | | |
| TCI 8700 × 1 | 39.54 | | | | |
| Cromax Verkehrsblau | | 40.02 | | | |
| Sikkens Q550 Autobase Plus MM mixture with Sikkens Q065 Autobase Plus MM | | | 46.90 | | |
| Fortidur 7908 | | | | 39.49 | |
| Felgensilber | | | | | 40.75 |
| Additional thickener | | | | | |
| Claytone 40 | | | | 0.98 | |
| EFKA ® RM 1920 | 0.17 | | | | |
| Total composition | 100.00 | 100.00 | 100.00 | 100.00 | 100.00 |

The stability of the five different compositions selected from the group consisting of organic solvent-based pastes, inks, paints or coating formulations with retroreflective properties (provided in step (c) or (e) of the process according to the invention) was determined by visual and tactile inspection of whether the sample shows sedimentation, syneresis or separation (phase or otherwise) right before resuspension and whether the sample shows sedimentation, syneresis or separation (phase or otherwise) directly after resuspension of the mixture. Moreover, it was determined whether the samples remained stable and homogeneous for a sufficiently long time after resuspension.

As will be appreciated by those skilled in the art, limited sedimentation, (phase) separation and/or syneresis of the organic solvent-based pastes, inks, paints or coating formulations with retroreflective properties (provided in step (c) or (e) of the process according to the invention) is no problem if said compositions can be resuspended, e.g. using simple stirring, to obtain compositions that remain stable and homogeneous for a sufficiently long time to process them (i.e. to apply them to a substrate of interest).

Resuspension was performed by vigorous mechanical stirring for 5 minutes with an overhead stirrer (without introducing air bubbles). Results of stability measurements directly before and after resuspension are listed in Table 5. Table 5 lists sedimentation, syneresis and 'bubbles/agglomerates' values that are determined in accordance with the classifications given in Table 2b.

TABLE 5 stability results

| Sample | T01231 | T01232 | T01233 | T01234 | T01235 |
|---|---|---|---|---|---|
| Date of manufacturing | 7 May 2021 | 7 May 2021 | 7 May 2021 | 7 May 2021 | 7 May 2021 |
| Date of present resuspension | 14 May 2021 | 14 May 2021 | 14 May 2021 | 14 May 2021 | 14 May 2021 |
| Days in between manuf. and present resuspension | 7 | 7 | 7 | 7 | 7 |
| Sediment. value before resuspension | 3 | 3 | 4 | 3 | 4 |
| Syneresis value before resuspension | 3 | 3 | 3 | 3 | 3 |
| Air bubbles/agglomerates value before resuspension | 3 | 3 | 3 | 3 | 3 |
| 5 May 2021 Stir-up (rpm/min) | 3.600/10 | 2.300/6 | 3.600/10 | 2.300/6 | 3.600/10 |
| Sedimentation value after resuspension | 4 | 4 | 4 | 4 | 4 |
| Syneresis value after resuspension | 4 | 4 | 4 | 4 | 4 |
| Air bubbles/agglomerates value after resuspension | 3 | 3 | 3 | 3 | 3 |
| Duration 'stability' (hrs) after resuspension | >3 hrs | >3 hrs | >3 hrs | >3 hrs | >3 hrs |

Example 4

The five different compositions selected from the group consisting of organic solvent-based pastes, inks, paints or coating formulations with retroreflective properties disclosed in Table 4 were applied for the corresponding 'Purposes' disclosed in Table 3 using the corresponding 'Application methods' disclosed in Table 3, resulting in visually appealing coated substrates with retroreflective properties.

Comparative Example

Five comparative retroreflective compositions were prepared by directly mixing compositions selected from the group consisting of organic solvent-based pastes, inks, paints or coating formulations (as defined in Example 3) with spherical glass beads as defined in Example 1. The comparative retroreflective compositions were prepared as follows. The commercial organic solvent-based paste, ink, paint or coating formulation without retroreflective properties was put in a beaker. The spherical glass beads were subsequently added, followed by thorough mixing with a Dispermill Orange-line 18/186 at 1000-2100 rpm during 7-10 minutes. The process was performed at ambient temperature (~20° C.). The amounts of the different ingredients in the resulting comparative compositions are listed in Table 6.

TABLE 6 composition comparative compositions

| Ingredients | T01236 amount [wt. %] | T01237 amount [wt. %] | T01238 amount [wt. %] | T01239 amount [wt. %] | T01240 amount [wt. %] |
|---|---|---|---|---|---|
| Spherical glass beads | | | | | |
| AA | 48.11 | | | 48.15 | 47.83 |
| BB | | 47.92 | 40.76 | | |
| Commercial organic solvent-based paste, ink, paint or coating formulation | | | | | |
| TCI 8700 × 1 | 51.89 | | | | |
| Cromax Verkehrsblau | | 52.08 | | | |
| Sikkens Q550 Autobase Plus MM mixture with Sikkens Q065 Autobase Plus MM | | | 59.24 | | |

TABLE 6-continued composition comparative compositions

| Ingredients | T01236 amount [wt. %] | T01237 amount [wt. %] | T01238 amount [wt. %] | T01239 amount [wt. %] | T01240 amount [wt. %] |
|---|---|---|---|---|---|
| Fortidur 7908 | | | | 51.85 | |
| Felgensilber | | | | | 52.17 |
| Total composition | 100.00 | 100.00 | 100.00 | 100.00 | 100.00 |

Stability of the five comparative retroreflective compositions was evaluated 7 days after manufacturing. Table 7 lists sedimentation, syneresis and 'air bubbles/agglomeration' values of the five comparative retroreflective compositions, that are determined in accordance with the classifications given in Table 2b. It turned out that the samples showed moderate to severe sedimentation so that they could not (samples T01236, T01237 and T01240) or hardly (T01238 and T01239) be resuspended. Moreover, sample T01239 showed air bubbles and agglomerates.

TABLE 7

| stability results | | | | | |
|---|---|---|---|---|---|
| Sample | T01236 | T01237 | T01238 | T01239 | T01240 |
| Sedimentation | 1 | 1 | 2 | 2 | 1 |
| Syneresis | 4 | 4 | 4 | 4 | 4 |
| Air bubbles/agglomerates | 3 | 3 | 3 | 2 & 1 | 3 |

The invention claimed is:

1. A method for providing retroreflective properties to a composition without retroreflective properties, the composition being selected from the group consisting of organic solvent-based pastes, organic solvent-based inks, organic solvent-based paints, and organic solvent-based coating formulations, the method comprising:

(a) mixing the composition without retroreflective properties with a retroreflective organic solvent-based composition in a weight ratio of between 30:70 to 70:30, to provide a composition with retroreflective properties;

(b) optionally mixing the composition with retroreflective properties obtained in (a) with from 0 to 4.5 wt. % synthetic pigment flakes, based on the total weight of the composition with retroreflective properties to obtain a mixture, the synthetic pigment flakes having an average diameter of from 5 μm to 150 μm, a thickness less than 1 μm, and an aspect ratio of at least 10; and (c) optionally mixing the composition with retroreflective properties obtained in (a) or the mixture obtained in (b) with 0 to 3 wt. % thickener, based on the total weight of the composition with retroreflective properties obtained in (a) or the mixture obtained in (b) to obtain a thickened mixture, wherein:

the composition without retroreflective properties has a Brookfield viscosity $\eta_1$, at a shear rate of 0.5 rpm and at a temperature of 20° C., of from 1 mPa·s as measured with a #1 spindle in a 600 mL beaker having a diameter of 8.25 cm to 300 Pa·s as measured with a #5 spindle in a 600 mL beaker having a diameter of 8.25 cm;

the retroreflective organic solvent-based composition has a first Brookfield viscosity $\eta_2$ at a shear rate of 0.5 rpm of from 5 Pa·s to 350 Pa·s and a second Brookfield viscosity $\eta_3$ at a shear rate of 20 rpm of from 100 mPa·s to 5000 mPa·s, provided $\eta_3$ is less than or equal to 0.5 times $\eta_2$, where $\eta_2$ and $\eta_3$ are measured at a temperature of 20° C. with a #4 spindle in a 600 mL beaker having a diameter of 8.25 cm; and the retroreflective organic solvent-based composition, based on the total weight of the retroreflective organic solvent-based composition, consists of:

10 wt. % to 49.85 wt. % organic solvent;

50 wt. % to 85 wt. % spherical glass beads having a median particle diameter D50, as measured with laser diffraction, from 1 μm to 1500 μm, and a refractive index, measured at a wavelength λ of 589 nm, from 1.5 to 2.8;

0.15 wt. % to 3.5 wt. % thickener; and 0 to 10 wt. % one or more further ingredients.

2. The method according to claim 1, wherein the retroreflective organic solvent-based composition, based on the total weight of the retroreflective organic solvent-based composition, consists of:

15 wt. % to 49.85 wt. % organic solvent;

50 wt. % to 80 wt. % spherical glass beads having a median particle diameter D50, as measured with laser diffraction, from 5 μm to 1500 μm, and a refractive index, measured at a wavelength λ of 589 nm, from 1.5 and 2.8;

0.15 wt. % to 3.5 wt. % thickener; and 0 to 10 wt. % one or more further ingredients.

3. The method according to claim 1, wherein:

the first Brookfield viscosity $\eta_2$ is from 8 Pa·s to 325 Pa·s;

the second Brookfield viscosity $\eta_3$ is from 110 mPa·s to 4000 mPa·s; and $\eta_3$ is less than or equal to 0.25 times $\eta_2$.

4. The method according to claim 1, wherein the composition without retroreflective properties has a Brookfield viscosity $\eta_1$, at a shear rate of 0.5 rpm and at a temperature of 20° C., of from 5 mPa·s, as measured with a #1 spindle in a 600 mL beaker having a diameter of 8.25 cm, to 280 Pa·s, as measured with a #5 spindle in a 600 mL beaker having a diameter of 8.25 cm.

5. The method according to claim 1, wherein the spherical glass beads have a refractive index, measured at a wavelength λ of 589 nm, of from 2.0 to 2.8 or from 1.7 to 2.1.

6. The method according to claim 1, wherein the spherical glass beads have a median particle diameter D50, as measured with laser diffraction, from 1 μm to 100 μm.

7. The method according to claim 1, wherein the spherical glass beads have a median particle diameter D50, as measured with laser diffraction, from 5 μm to 100 μm.

8. The method according to claim 1, wherein some or all of the spherical glass beads in the retroreflective organic solvent-based composition are hemispherically coated with an aluminium coating.

9. The method according to claim 1, wherein the organic solvent of the retroreflective organic solvent-based composition is selected from the group consisting of aliphatic and aromatic solvents, ketones, esters, glycoethers, alcohols, halogenated hydrocarbons, and combinations thereof.

10. Method according to claim 1, wherein the thickener in the retroreflective organic solvent-based composition is selected from the group consisting of hydrogenated castor oil, modified hydrogenated castor oil, clay, modified clay, calcium sulfonate complex, organophilic phyllosilicate, silica gel, synthetic amorphous silica, acrylic acid type gellants, modified cellulosic materials, polyurea dispersions, solutions of urea-modified polyamides, polyurethane dispersions, and combinations thereof.

11. The method according to claim 1, wherein the amount of thickener in the retroreflective organic solvent-based composition is from 0.20 wt. % to 3.0 wt. %, based on the total weight of the retroreflective organic solvent-based composition.

12. The method according to claim 1, wherein:

the amount of the one or more further ingredients in the retroreflective organic solvent-based composition is from greater than 0 to 10 wt. %, based on the total weight of the retroreflective organic solvent-based composition; and the one or more further ingredients are selected from the group consisting of foam control agents, preservatives, dyes, curing initiators, luminescent agents, pigments, UV-absorbers, binders, and resins.

13. The method according to claim 1, wherein (a), (b) and/or (c) are performed at a temperature from 15° C. to 30° C. under stirring.

14. The method according to claim 1, wherein (a) comprises adding the retroreflective organic solvent-based composition to the composition without retroreflective properties.

15. The method according to claim 1, wherein in (a), the composition without retroreflective properties is mixed with the retroreflective organic solvent-based composition in a weight ratio of from 40:60 to 60:40.

16. The method according to claim 1, wherein in step (c), the composition with retroreflective properties obtained in (a) or the mixture obtained in (b) is mixed with 0 to 2.5 wt. % thickener, based on the total weight of the composition with retroreflective properties obtained in (a) or the mixture obtained in (b).

17. A method of applying a retroreflective composition, the method comprising:

screen printing, spray coating, curtain coating, or spray painting onto a substrate a composition obtained by the method according to claim 1 selected from the composition with retroreflective properties obtained in (c), the mixture obtained in (d), or the thickened mixture obtained in (e).

* * * * *